United States Patent [19]

Schuck

[11] 4,371,952
[45] Feb. 1, 1983

[54] DIAGNOSTIC CIRCUITRY FOR ISOLATING A FAULTY SUBSYSTEM IN A DATA PROCESSING SYSTEM

[75] Inventor: David B. Schuck, Escondido, Calif.
[73] Assignee: NCR Corporation, Dayton, Ohio
[21] Appl. No.: 261,316
[22] Filed: May 6, 1981
[51] Int. Cl.³ .............................................. G06F 11/00
[52] U.S. Cl. ................................... 364/900; 371/16
[58] Field of Search ... 364/200 MS File, 900 MS File; 371/15, 16, 25; 340/825.16

[56] References Cited

U.S. PATENT DOCUMENTS

| | | | |
|---|---|---|---|
| 3,573,751 | 4/1971 | DeLisle | 364/900 |
| 4,149,241 | 4/1979 | Patterson | 364/200 |

*Primary Examiner*—Charles E. Atkinson
*Assistant Examiner*—Thomas M. Heckler
*Attorney, Agent, or Firm*—J. T. Cavender; Edward Dugas; Stephen F. Jewett

[57] ABSTRACT

A data processing system that has a plurality of subsystems connected to a system bus includes diagnostic circuitry for isolating a fault at one of the subsystems. The diagnostic circuitry includes a multiplexer at the output gates of each subsystem to the system bus and diagnostic selection circuitry at a bus controller that provides a select signal to each multiplexer. When selected, the multiplexer is connected to pass a "high" logic level signal to an associated bit line of the system bus. When a bit line of the system bus is "stuck high," because of a fault at the output of one of the subsystems, the diagnostic circuitry selectively connects each subsystem to the bit line of the system bus in order to provide a "high" logic level signal to that bit line. A test interface and A/D converter are connected to the bit line, and if a voltage level change is detected after a subsystem is connected, the connected subsystem is not the one having the fault. If no voltage level change is detected, it is known that that subsystem is the faulty one.

10 Claims, 4 Drawing Figures

DIAGNOSTIC CIRCUITRY FOR ISOLATING A FAULTY SUBSYSTEM IN A DATA PROCESSING SYSTEM

BACKGROUND OF THE INVENTION

The present invention relates to data processing systems and, more particularly, to diagnosing errors in such systems.

Substantial resources are often devoted to the prevention and correction of errors that may occur as data is being processed in a data processing system. Such errors may result, for example, from faults in the system that may occur during manufacture or during operation, or from environmental factors, such as electromagnetic interference (EMI), radio frequency interference (RFI), and alpha particle radiation. It has been long known to use parity bits, error correction codes, processor diagnostic circuitry and the like to maintain data as error-free as possible while it is being processed in a data processing system.

Many errors in large data processing systems are diagnosed and corrected by the use of a processor that is used exclusively for diagnosis and maintenance functions. For example, in the 8500 Series of computer systems sold by NCR Corporation, Dayton, Ohio, a service subsystem performs a number of diagnostic and maintenance functions during the operation of the computer system. Specifically, the NCR service subsystem has responsibility for executing programs that test various parts of the computer system when an error is detected. Other functions include controlling an operator console, controlling a disc driver so that firmware stored on a flexible disc can be loaded into the control store of the system's central processor, and performing similar maintenance-related functions either on a continuing basis during the operation of the computer system or as may be selected by a service technician when the computer system is being serviced.

While conventional forms of error diagnosis are suitable in most instances, there are some instances when they cannot be used. For example, in a computer system that is bus-oriented, i.e., that has a plurality of subsystems (or printed circuit boards) that are connected along a single system bus, a hardware fault at any output gate that connects any one of the subsystems to the system bus may prevent the bus from being used to diagnose the system to locate the fault. In particular, if the circuitry in the subsystems is implemented using ECL (emitter-coupled logic) technology, a fault at an output gate will often cause a bit line of the system bus to be "stuck" at a "high" or "1" logic level. In such a circumstance, the bit line will remain "high" until the fault is corrected. While the bit line is "high" it cannot be used, for example, by a service subsystem to address each subsystem in order to diagnose the error.

There has, therefore, arisen the need for diagnostic circuitry that can be used, in conjunction with conventional servicing and diagnosing circuitry, to determine which one of a plurality of subsystems is causing a bus to be held at a voltage or signal level that makes the bus unavailable for use in conventional diagnostic operations.

SUMMARY OF THE INVENTION

There is provided, in accordance with the present invention, a data processing system having a plurality of subsystems connected to a system bus and having diagnostic circuitry for locating the one of the subsystems having a fault resulting in a fault signal on the bus and the bus being continuously held at a predetermined logic level. In particular, the diagnostic circuitry includes means for selectively and operatively connecting each subsystem to provide a test signal of the same predetermined logic level to the bus and means for detecting a change in the signal on the bus after each subsystem is connected.

The present invention has particular suitability in a data processing system wherein the circuitry in the subsystems are implemented using ECL (emitter-coupled logic) technology. Circuit gates that are implemented using ECL technology have the characteristic of continuously providing at their output a "high" logic level signal ($-0.8$ V) when a fault occurs. Accordingly, in the disclosed data processing system, when an output gate at any one of the subsystems has a fault, the bit line of the system bus to which such output gate is connected is held or "stuck" at a "high" logic level and cannot be used, for example, to address each subsystems to perform diagnostic operations.

It has been found that, when two subsystems implemented in ECL technology are both selected or connected to provide "high" logic level signals at their outputs to a bit line of the system bus, the resulting voltage level on the bit line will increase by a detectable, albeit small, amount over the normal voltage level of a "high" logic level signal. This is attributable to the nature of the transistor at such output gates, which tends to act as a diode at its collector-to-emitter path to the system bus.

The resistance of this "diode" tends to increase (and the current through it decreases) as the voltage across the diode increases. As a result, when a transistor at each of two subsystems is connected to the system bus, with each transistor acting as a diode and providing current in order to drive the system bus to a "high" logic level, both transistors reach an equilibrium point at which each is providing slightly more than half the total current that it would provide to the system bus if it were the only transistor connected to provide a "high" logic level signal. Accordingly, the resistors at the terminal ends of the system bus have a voltage drop that is slightly greater than they would have if only one transistor were connected to the system bus, and the voltage level of the system bus itself rises.

When one subsystem has a fault at its output gate to the system bus, the transistor at that one output gate is continuously connected to the system bus to provide a "high" logic level signal. When a good subsystem (i.e., a subsystem not having a fault) is then also connected to the system bus, the result is two transistors providing a "high" logic level signal to the system bus and a detectable increase in the voltage level of the system bus. When an attempt is made to selectively connect the faulty subsystem to the bus, however, the faulty subsystem is already providing a "high" logic level signal to the system bus. Since the bad subsystem is the only subsystem connected to provide a "high" signal to the system bus, the voltage level of the signal on the bus will not change. As a result, when a subsystem is connected to provide a "high" logic level signal and a change is detected on the system bus, it is known that that subsystem is not the one having a fault. When a subsystem is connected and no change in voltage level on the system bus is detected, it is known that that one of the subsystems is the one having the fault.

In the disclosed preferred embodiment of the present invention, there is provided a data processing system comprising a plurality of subsystems connected to a system bus. The subsystems are implemented using ECL technology so that a fault at the output gate of any one of the subsystems will result in a bit line of the system bus being held or "stuck" at a "high" logic level. Diagnostic circuitry is provided for isolating the faulty subsystem without having to use the system bus to address the subsystems.

The disclosed data processing system includes a service subsystem which performs conventional maintenance and diagnostic functions, and a bus controller for controlling the system bus so that, during normal operation, each subsystem may request and be given use of the system bus for communicating with other subsystems. The diagnostic circuitry includes, in accordance with the present invention, diagnostic selection circuitry in the bus controller that provides a SELECT signal for selectively connecting during diagnosis each subsystem to the system bus and diagnostic switching means, in the form of a multiplexer, at each subsystem for providing, in response to the select signal from the diagnostic selection circuitry, a "high" logic level signal at the output gate of the subsystem to the system bus. The diagnostic circuitry further includes an analog-to-digital converter that is connected to the system bus by a test interface and that detects any change in the voltage level on the system bus that is due to both the faulty subsystem and any one of the good subsystems providing a "high" logic level signal to the system bus. An absence of such a change will indicate that the subsystem that has just been selectively connected to the system bus is the faulty subsystem. The test interface is a test probe manually connected to the "stuck" bit line by a service technician in the preferred embodiment.

It is, therefore, an object of the present invention to provide an improved data processing system.

It is another object of the present invention to provide a data processing system having a plurality of subsystems connected to a system bus, wherein diagnostic circuitry indicates a fault at one of the subsystems.

It is still another object of the present invention to provide diagnostic circuitry for diagnosing errors in a data processing system, wherein plural subsystems in the data processing system are connected to a system bus and wherein each of the subsystems may cause the system bus to be held at a predetermined signal level.

Still a further object of the present invention is to provide diagnostic circuitry for isolating a faulty subsystem in a data processing system that may be holding one bit line in a system bus at a predetermined signal level and prevent conventional service and diagnostic components from isolating such a faulty subsystem.

Other objects will be apparent from the following description and the drawings.

DETAILED DESCRIPTION OF THE PREFERRED EMBODIMENT

Figure 1:
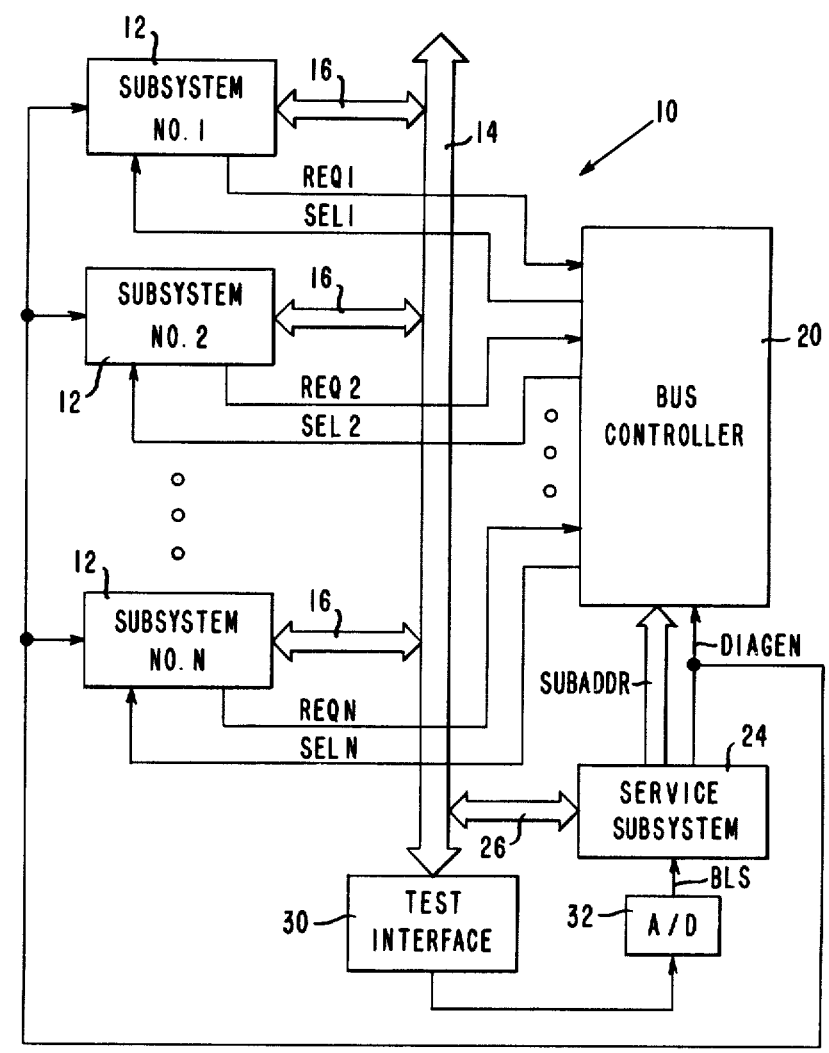
FIG. 1 is a block diagram of a data processing system in accordance with the present invention.

Referring now to FIG. 1, there is shown a data processing system 10 in accordance with the present invention. The data processing system 10 includes a plurality of subsystems 12, with the subsystems numbered from 1 through N in FIG. 1. Each of the subsystems 12 performs conventional data processing functions, such as arithmetic-logic, timing, control, or memory functions. In an actual data processing system, such as the NCR 8500 System mentioned earlier, each of the subsystems 12 would consist of a single printed circuit (PC) board having electronic components mounted thereon. Any particular one of the just mentioned data processing functions may be performed in one or more of the subsystems or PC boards.

Signals are carried between the subsystems 12 by a system bus 14. The system bus 14 includes a plurality of bit lines or wires for carrying parallel bits of information, such as data, memory addresses, subsystem addresses and control signals. Signal paths 16 are provided between each subsystem 12 and the system bus 14, with the operative connection of each subsystem 12 to the system bus 14 in order to transmit signals controlled by a bus controller 20. As depicted in FIG. 1, each subsystem 12 may request use of the system bus 14 by providing one of a group of request signals (REQ1-REQN) to the bus controller 20. The bus controller 20 normally permits only one of the subsystems 12 to be operatively connected to the system bus 14, and provides one of a group of select signals (SEL1-SELN) to the corresponding one of the subsystems 12 that is to be connected to the system bus.

A service subsystem 24 is also shown in FIG. 1. The service subsystem 24 is connected to the system bus 14 by signal paths 26 and performs maintenance and diagnostic operations in the data processing system 10. Although not shown in FIG. 1, if the data processing system 10 were the previously mentioned NCR 8500 System, the service subsystem 10 would also be connected directly to at least one of the subsystems 12 in order to permit the service subsystem 24 to control the loading of firmware or microcode into the control store of the central processor (not specifically shown) in the system.

The data processing system 10 as thus far described, including the operation of the subsystems 12, the system bus 14, the bus controller 20 and the service subsystem 24, is conventional.

In the preferred embodiment, it is contemplated that the circuit components mounted on each of the PC boards that are represented by one of the subsystems 12 in FIG. 1 are manufactured using emitter-coupled logic (ECL) technology. As is well-known to those skilled in the art, one aspect of ECL logic elements or gates is that the output of such a gate may become "stuck" at a "high" or "1" logic level ($-0.08$ V). This results from a fault at the logic gate that is due, for example, to a manufacturing defect or to physical damage of the gate. When such a fault occurs within one of the subsystems 12 at a gate other than at the output gate to the connecting signal paths 16 going to the system bus 14, normal diagnostic operations performed by the service subsystem 24 will be able to adequately diagnose the errors by locating the specific location of the fault in one of the subsystems 12 and either taking corrective measures or indicating the fault location to a service technician. However, if the fault is located at the gate which is at the output of any one of the subsystems 12 to the signal paths 16 and the system bus 14, diagnosis can be made difficult, if not impossible. This is due, of course, to the fact that, if the output gate is "stuck" at a "high" logic level, the bit line or wire within the system bus 14 which is connected to that output gate will have a continuous "high" fault signal and cannot, for example, be used by the service subsystem 24 to address the subsystems 12 in order to locate the subsystem having the fault.

In order to overcome the above-mentioned problem of an output gate being "stuck high," there is provided, in accordance with the present invention, diagnostic circuitry at each of the subsystems 12 and at the bus controller 20 that will aid the service subsystem 24 in isolating such faults. In particular, each of the subsystems 12 includes output gates, which will be described below in conjunction with FIG. 2, for receiving a diagnostic enabling signal DIAGEN from the service subsystem 24. The signal DIAGEN controls every output gate at each of the subsystems 12 to pass a test signal having the same logic level ("high" or "1") as the signal on the "stuck" bit line. In addition, the bus controller 20 includes circuitry that provides the select signals (SEL-1-SELN) during diagnosis to selectively and operatively connect each subsystem to the system bus 14 in response to subsystem address signals SUBADDR from the service subsystem 24, in order to provide the "high" logic level signal to the bit lines of the bus. A test interface 30 is connected to the "stuck" bit line of the system bus 14 in order to sense the voltage level of the signal on the line. The test interface 30 provides the sensed voltage to an analog-to-digital (A/D) converter 32, which detects any change in the voltage on the bit line after each of the subsystems 12 is selectively connected to the system bus 14 by the bus controller 20.

As mentioned earlier, it has been found in systems (such as system 10) employing ECL technology that, when any two subsystems 12 both provide a "high" or "1" logic level signal to a bit line in the system bus 14, there will be a slight increase in the voltage level of the signal on the bit line. In particular, if one of the bit lines is held "high" by a faulty subsystem, there will be a slight increase (50 to 60 millivolts) in the voltage level on that bit line when a second subsystem provides a "high" logic level signal to that same bit line. Accordingly, the A/D converter 32 will detect a change in the bit line as each subsystem 12 is selectively connected to the system bus 14, except in the case where the faulty subsystem is connected. In such case, since the faulty subsystem is already holding the bit line "high," there remains only one subsystem (the faulty subsystem) holding the bit line high, and the voltage on the bit line will remain unchanged.

Any voltage change is represented as a digital signal BLS to the service subsystem 24 so that the location of the faulty subsystem can be indicated or recorded and later used by a service technician to correct the fault by, for example, replacing a circuit component or PC board.

Although not shown in the drawings, since the subsystems 12 all employ ECL logic elements, both ends of all the bit lines in the system bus 14 are, as conventional, connected to resistors, which in turn are connected to a voltage source, such as a $-2$ V source. The current from any subsystem providing a "high" logic level signal to a bit line of the system bus is passed through the resistor to the $-2$ V source.

While not illustrated in FIG. 1, in the practice of the present invention it is preferred that the test interface 30 consist of a test probe that can be manually connected to any one of the bit lines in the system bus 14 before each of the subsystems 12 is selectively connected to the system bus. The use of a manual probe is preferred, since a service technician or the service subsystem 24 can normally detect which of the bit lines in the system bus 14 is "stuck" at a "high" logic level and, hence, it is only necessary to determine which subsystem is holding that bit line at the "high" logic level.

Figure 2:
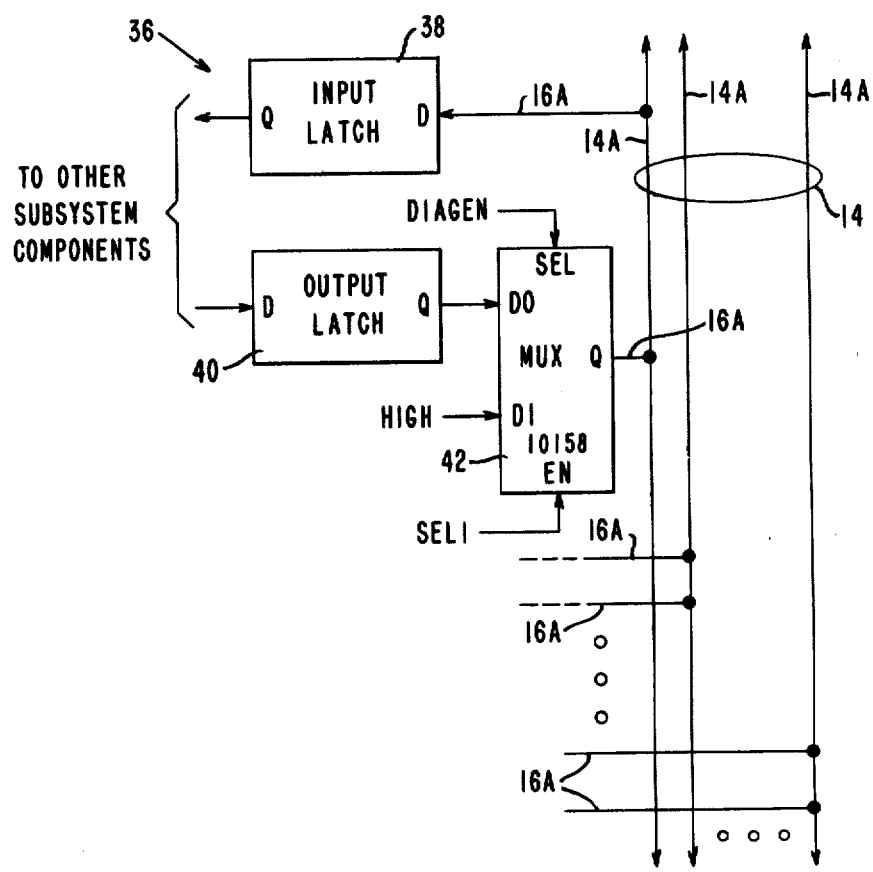
FIG. 2 is a circuit diagram illustrating the connection of each subsystem to the system bus in the data processing system of FIG. 1.

In FIG. 2 there is shown input/output circuitry 36 associated with one of the subsystems 12 (Subsystem No. 1) of FIG. 1. There would be similar circuitry associated with each of the other subsystems 12. As indicated in FIG. 2, the circuitry 36 interconnects the system bus 14 (by way of wires 16A of the signal paths 16) and the components (other than circuitry 36) of its associated subsystem, and the circuitry 36 buffers or temporarily stores the data being passed between the associated subsystem and the system bus 14.

The circuitry 36 includes an input latch 38 and an output latch 40 associated with each bit line 14A of the system bus 14, with the circuitry associated with only one of the bit lines 14A seen in FIG. 2. The input latch 38 temporarily stores a data bit that is being provided from its associated bit line 14A in the system bus 14 and the output latch 40 temporarily stores a data bit being provided to its associated bit line 14A in the system bus 14. The output of the output latch 40 is connected to its associated bit line by a multiplexer 42. The multiplexer 42 is that part of the diagnostic circuitry of the present invention that is located at the subsystem 12 which will aid in isolating the subsystem that has an output gate fault. In addition, the multiplexer 42 is itself the output gate of its subsystem 12, since it is the final element or gate of the subsystem which connects to the system bus 14. Accordingly, a fault at the multiplexer 42 will cause the associated bit line 14A to be "stuck" at a "high" logic level. Of course, if there were no part of the diagnostic circuitry at each of the subsystems 12 as described above (and, hence, no multiplexer 42), then the output latch 40 would be the output gate of the subsystem 12 and the previously mentioned problems of isolating the fault would exist. As indicated in FIG. 2, the multiplexer 42 may be an MECL multiplexer, part no. 10158, available from Motorola Semiconductor Products, Inc., Phoenix, Arizona.

The multiplexer 42 receives at its data input D0 the bit from the output of the output latch 40 and receives at its data input D1 a "high" logic level signal. The select input SEL of the MUX 42 receives the signal DIAGEN and the enable input EN of the MUX 42 receives the select signal for its subsystem (SEL1 in FIG. 2) from the bus controller 20. The MUX 42 is enabled whenever the associated subsystem has been selected by the bus controller 20 to be connected to the system bus 14. During normal operations, the signal DIAGEN will be at a "high" logic level and will cause each MUX 42 in every subsystem to pass only the data bit at its input D0 to its output Q. However, when the signal DIAGEN goes "low," and a subsystem receives its select signal, the "high" at the input D1 is passed.

This "high" is then used, as has been described earlier, to check the bit line to which it is provided in order to determine if that subsystem has a fault. Of course, if the subsystem being selected to provide a "high" is the faulty subsystem, then the output of the MUX 42 is already stuck "high" and the A/D converter 32 (FIG. 1) will not detect a change in the voltage of the signal on the bit line.

As should be apparent, the select signal (such as the signal SEL1 in FIG. 2) is delivered to the MUX 42 associated with every bit line 14A at the selected subsystem, so that each bit line receives a "high" logic level signal. Since a manual probe is used and only one bit line would typically be "stuck high," only the one "stuck" bit line is connected to the test interface 30 to find the faulty subsystem.

Figure 3:
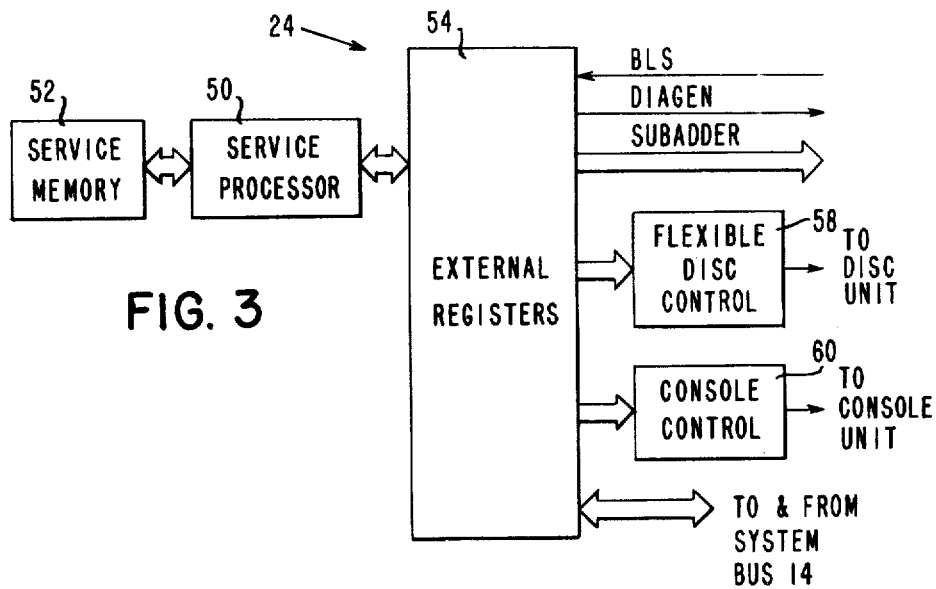
FIG. 3 is a simplified block diagram of the service subsystem in the data processing system of FIG. 1.

FIG. 3 illustrates the major components of the service subsystem 24. The illustrated service subsystem 24 is of the same type as found in the NCR 8500 System. As can be seen, the service subsystem 24 includes a service processor 50 that is connected to a service memory 52 and to external registers 54. The service processor 50 executes programs and operates on data that is stored in the service memory 52 and communicates with the rest of the data processing system 10 by way of the external registers 54. For example, as seen in FIG. 3, commands may be passed from the service processor 50 and by way of the external registers 54 to a flexible disc control 58 for controlling a disc unit (not shown) or may be passed to a console control 60 for controlling a console unit (not shown). Furthermore, data to be provided to or that is being received from the system bus 14 by way of signal paths 26, as mentioned earlier in connection with FIG. 1, are passed to the external registers 54, as are the signal BLS from the A/D converter 32, the signal DIAGEN that is passed to the bus controller 20 and each of the subsystems 12, and the subsystem address signals SUBADDR that are passed to the bus controller 20. After each subsystem is operatively connected to the system bus 14 the values of the signal BLS can be taken from the external registers 54 and stored in the service memory 52 and later retrieved to determine which subsystem has a faulty output gate.

Although not illustrated in the drawings, the service processor 50 may be programmed in a conventional and simple fashion to provide the signal DIAGEN when diagnosis is to take place, to generate the signals SUBADDR for addressing each subsystem in order to cause the bus controller 20 to selectively connect each subsystem to the system bus, and to receive and record the signal BLS in order to determine which of the subsystems has a faulty output gate. Alternatively, of course, switches could be manually set by a service technician to generate the signals DIAGEN and SUBADDR without the use of the service subsystem 24, and an indicator, such as a lamp, could receive the signal BLS and be visually monitored as each subsystem is selectively addressed in order to determine whether the selected subsystem has a faulty output gate.

Figure 4:
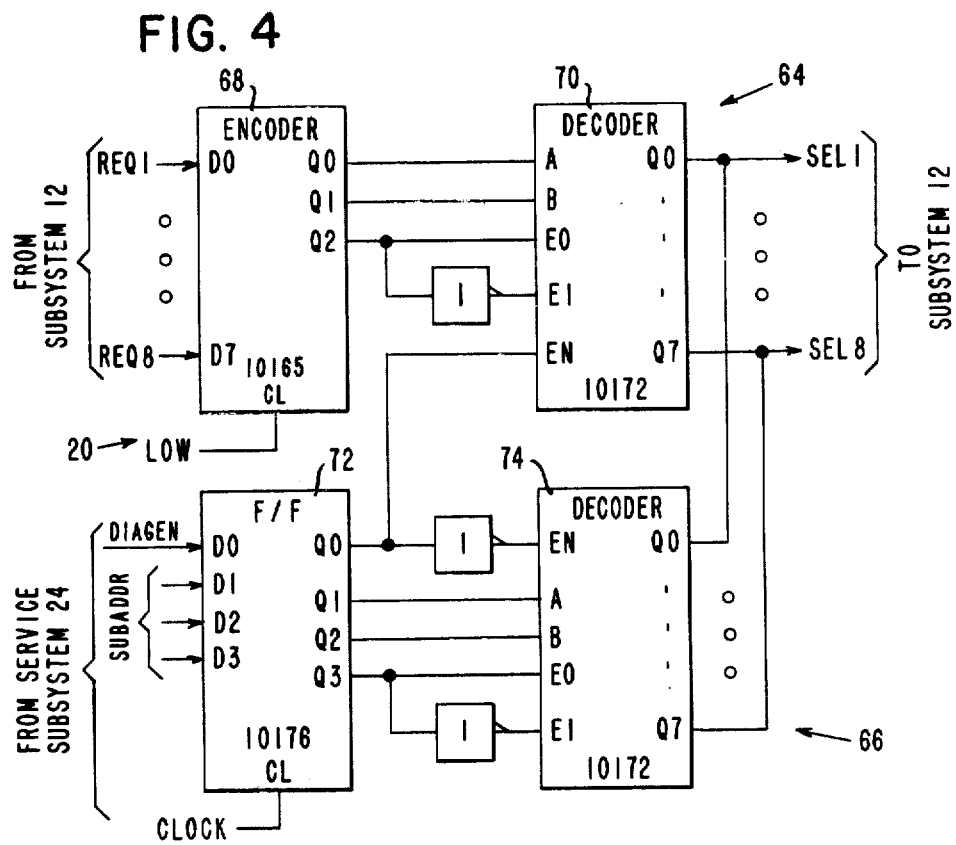
FIG. 4 is a circuit diagram illustrating the bus controller seen in FIG. 1, including diagnostic selection circuitry for providing a select signal to selectively connect each subsystem to the system bus during diagnosis.

In FIG. 4 there is shown in greater detail the bus controller 20. For purposes of describing the bus controller 20 in FIG. 4, it is assumed that there are only eight subsystems 12. The bus controller 20 includes normal subsystem selection circuitry 64 that is used during normal operation of the system 10 and diagnostic selection circuitry 66 that is used only during diagnosis of the system when one bit line of the system bus 14 is "stuck high." The circuitry 64 (seen toward the top of FIG. 4) receives request signals (REQ1-REQ8) from any one of the subsystems 12 and selects, by the signals SEL1-SEL8, the one of the subsystems 12 that will be connected to the system bus 14. To accomplish such a result, the circuitry 64 includes a priority encoder 68 which receives the signals REQ1-REQ8, selects the subsystem having the highest priority in the event that two or more subsystems simultaneously request use of the system bus 14, and provides an encoded address of the selected subsystem at its output. The priority encoder 68 receives a low signal at its clock input CL so that its output follows the input without latching.

The output of the priority encoder 68 is provided to a dual decoder 70, which provides at its output the signals SEL1-SEL8 that select the one of the subsystems 12 that is to be connected to the system bus 14. The decoder 70 is enabled at its enabling input EN during normal bus operations.

The diagnostic selection circuitry 66 (seen toward the bottom of FIG. 4) is part of the diagnostic circuitry in the system 10 that, as mentioned earlier, is used to isolate a fault when one of the bit lines in the system bus 14 is "stuck high." The circuitry 66 includes a flip-flop circuit 72 and a decoder 74. The flip-flop circuit 72 receives the signal DIAGEN which goes "low" when a bit line "stuck" at a "high" logic level is to be diagnosed, and the address signals SUBADDR (three bits) that address the one of the subsystems 12 that is to be selectively connected to the system bus 14. Flip-flop circuit 72 is clocked by a clocking signal CLOCK from the service subsystem. The signal DIAGEN is latched into the flip-flop circuit 72 and is passed to the enabling inputs of both the decoder 70 and the decoder 74. When diagnosis is to take place, the signal DIAGEN goes "low" and the decoder 70 is disabled and the decoder 74 is enabled. The address signals SUBADDR are also latched into the flip-flop circuit 72, and are passed to the data inputs of the decoder 74. The outputs of the decoder 74 are OR-wired to the outputs of the decoder 70 in order to provide, during diagnosis, the signals SEL1-SEL8 for selecting the one of the subsystems 12 that is to have the "high" passed at the output of its MUX 42 (FIG. 2) to its associated bit line of the system bus 14.

It should be apparent from the foregoing description that, during normal system bus operations, the bus controller 20 receives requests from each of the subsystems 12, and in accordance with a predetermined priority scheme that is implemented by the priority encoder 68 in the normal selection circuitry 64, selects the subsystem with the highest priority to be connected to the system bus 14. When one of the bit lines in the system bus 14 is "stuck high," the diagnostic selection circuitry 66 is enabled so that the subsystems 12 are selected or selectively connected to the system bus 14 in accordance with the address signals SUBADDR received from the service subsystem 24.

The priority encoder 68, decoder 70, flip-flop circuit 72 and decoder 74 are all available from Motorola Semiconductor Products, Inc., with the part numbers of each indicated in FIG. 4.

While in the preferred embodiment the test interface 30 (FIG. 1) consists of a test probe that is used manually to connect any one of the bit lines to the A/D converter 32, it should be obvious that switches controlled in a conventional fashion by the service subsystem 24 could also be used to connect each bit line to the A/D converter.

The A/D converter 32 may be a conventional analog-to-digital converter, such as the ADC-7109 A/D converter available from Datel-Intersil, Inc., Mansfield, Mass.

While the preferred embodiment of the present invention has been described, it should be apparent that within the purview of the present invention various changes may be made within the scope of the appended claims.

I claim:

1. In a data processing system having a plurality of subsystems connected to a system bus, wherein a fault at one of said subsystems will cause a signal of a predetermined level to be continuously provided to said bus, the improvement wherein said data processing system further comprises diagnostic circuitry for locating the one of said subsystems having the fault, said diagnostic circuitry comprising:
 means associated with each of said subsystems for selectively providing a signal of said predetermined level to said bus; and
 means connected to said bus for detecting a change in the condition of said bus after each of said subsystems selectively provides said predetermined level signal to said bus.

2. In a data processing system having a plurality of subsystems connected to a system bus, each of said subsystems having an output gate for operatively connecting that subsystem to said system bus, wherein a fault at said output gate of one of said subsystems will result in a continuous signal of a predetermined level on said system bus, the improvement wherein said data processing system further comprises diagnostic circuitry for locating the one of said subsystems having the faulty output gate without using said system bus to address each of said subsystems, said diagnostic circuitry comprising:
 means at the output gate of each of said subsystems for selectively connecting said output gate to provide a signal of said predetermined level to said system bus; and
 means connected to said system bus for detecting a change in the level of the signal on said system bus after said output gate of each of said subsystems provides the predetermined level signal.

3. The data processing system of claim 2, wherein said system bus comprises a plurality of bit lines and wherein said means for selectively connecting said output gate comprises switching means associated with each of said bit lines at each of said subsystems, said switching means having at least two inputs, with one of said inputs receiving the signal of the predetermined level so that said switching means passes the signal of predetermined level to its associated one of said bit lines.

4. The data processing system of claim 3, wherein each of said subsystems is implemented in ECL technology, and wherein each of said subsystems includes an output gate connected to each one of said bit lines of said system bus, said output gate providing a continuous predetermined binary logic level signal to its one of said bit lines if said output gate has a fault, and wherein said switching means is said output gate.

5. The data processing system of claim 4, wherein the predetermined binary logic level signal provided by the output gate having a fault is a "high" logic level signal, wherein said switching means associated with each of said bit lines passes a "high" logic level signal from the one of its said inputs, and wherein said means for detecting a change in the level of the signal on said bus detects a change in the voltage level of the one of said bit lines connected to the faulty output gate, so that a change in the voltage level on the one of said bit lines after its associated switching means at one of said subsystems passes the "high" logic level signal indicates that that subsystem does not have the faulty output gate, and so that a lack of change in the voltage level on the one of said bit lines after its associated switching means at one of said subsystems passes the "high" logic level signal indicates that that subsystem has the faulty output gate.

6. The data processing system of claim 4, wherein said means for detecting a change in the level of the signal on said system bus comprises an analog-to-digital converter connected for receiving the signal on one of said bit lines of said system bus and providing a digital signal indicating a change in the voltage level of the signal on that one of said bit lines.

7. The data processing system of claim 3, wherein said data processing system further comprises a bus controller for selectively connecting each of said subsystems to said system bus, and wherein said means for selectively connecting each output gate to provide the predetermined level signal to said system bus further comprises diagnostic selection means within said bus controller for providing a select signal to each said switching means at each of said subsystems, said switching means enabled by the select signal to pass the predetermined level signal at the one of its inputs.

8. The data processing system of claim 3, wherein said data processing system further comprises a service subsystem programmed to provide a diagnostic enable signal to indicate that the subsystem having the fault is to be isolated and to provide address signals to address each of said subsystems, a bus controller for controlling the connection of each of said subsystems to said system bus and providing a select signal to each of said subsystems in response to the address signals from said service subsystem, and wherein said switching means comprises a multiplexer for receiving the diagnostic enable signal provided by said service subsystem and for receiving the select signal from said bus controller, and in response providing the predetermined level signal to said system bus.

9. In a data processing system having a plurality of subsystems connected to a system bus, each of said subsystems implemented in ECL technology and having an ECL output gate for operatively connecting that subsystem to said system bus, wherein a fault at said output gate of one of said subsystems will result in a continuous fault signal of a predetermined level on said system bus, the improvement wherein each said output gate includes means for selectively providing a test signal of the same predetermined level as the fault signal to said system bus and wherein said data processing system further comprises means connected to said system bus for detecting a change in the level of the fault signal on said system bus after each said output gate provides the test signal, whereby a change in the level of the fault signal on said system bus after one said output gate selectively provides the test signal indicates that that output gate does not have a fault and whereby a lack of change in the level of the fault signal on said system bus after one said output gate selectively provides the test signal indicates that that output gate has a fault.

10. A method for isolating a faulty subsystem in a data processing system of the type having a plurality of subsystems connected to a system bus, wherein said subsystems are implemented in ECL technology and wherein a fault at one of said subsystems will result in a signal of a predetermined level being continuously provided to said system bus, said method comprising:

providing means at each of said subsystems that can be selected to provide a signal of the same predetermined level to said system bus;

selecting each of said subsystems to provide the predetermined level signal; and detecting the condition of said system bus after each of said subsystems is selected to provide the predetermined level signal, with a change in the condition of said system bus after each one of said subsystems is selected indicating that that one of said subsystems is not the faulty subsystem, and a lack of a change after each one of said subsystems is selected to provide the predetermined level signal indicating that that one of said subsystems is the faulty subsystem.

* * * * *